United States Patent
de Mersseman et al.

[11] Patent Number: 6,157,880
[45] Date of Patent: Dec. 5, 2000

[54] CRASH DETECTOR RESPONSIVE TO A SIDE IMPACT

[75] Inventors: Bernard de Mersseman, La Varenne-Saint-Hilaire; Frédéric Poux, Grenoble; Jérôme Villanneau, Chaumonten-Vexin, all of France

[73] Assignee: Autoliv Developement AB, Vagarda, Sweden

[21] Appl. No.: 09/142,587

[22] PCT Filed: Feb. 19, 1997

[86] PCT No.: PCT/SE97/00269

§ 371 Date: May 7, 1999

§ 102(e) Date: May 7, 1999

[87] PCT Pub. No.: WO97/33776

PCT Pub. Date: Sep. 18, 1997

[30] Foreign Application Priority Data

Mar. 14, 1996 [GB] United Kingdom .................. 9605387

[51] Int. Cl.[7] .................................................. G06F 7/00
[52] U.S. Cl. ......................... 701/45; 701/36; 701/124; 280/728.3; 280/730.2; 280/734; 280/735; 340/436; 307/9.1
[58] Field of Search ................................ 701/45, 36, 124; 280/728.1, 728.2, 728.3, 730.2, 735, 734; 340/933, 936, 436; 307/9.1

[56] References Cited

U.S. PATENT DOCUMENTS 5,779,264 7/1998 de Mersseman et al. ............. 280/735

Primary Examiner—William A. Cuchlinski, Jr.
Assistant Examiner—Yonel Beaulieu
Attorney, Agent, or Firm—Venable; George H. Spencer; Robert Kinberg

[57] ABSTRACT

A crash detector activates a safety device (3, 4) such as an air-bag in a vehicle. The crash detector incorporates an acceleration sensor (10), the output of which must pass a threshold (11) before the signal is processed by a signal processor (2). The signal is processed optionally in conventional ways (13, 14; 16, 17) to activate the safety device. Activation of the safety device is inhibited by a slam algorithm generator (18). In the slam algorithm generator a control signal is generated which converges towards an average of the acceleration signal during periods of time in which the acceleration signal indicates an inward acceleration in excess of a predetermined level, the control signal being reduced at a substantially constant rate with time during periods in which the acceleration is not in excess of said predetermined level. The control signal is passed to a threshold means (19) which enables (15) actuation of the safety device (3, 4).

21 Claims, 3 Drawing Sheets

CRASH DETECTOR RESPONSIVE TO A SIDE IMPACT

FIELD OF INVENTION

THE PRESENT INVENTION relates to a crash detector and more particularly, relates to a crash detector for use in a motor vehicle. In particular, the present invention relates to a crash detector adapted to respond to a side impact.

BACKGROUND OF THE INVENTION

It has been proposed to provide a crash detector to respond to a side impact in a motor vehicle. Typically, the crash detector incorporates a sensor which is mounted on the door or which is mounted on part of the door-frame, such as the B-pillar. The sensor may comprise an accelerometer.

When a vehicle provided with such crash detector is involved in a side impact, part of the vehicle, where the accelerometer is mounted, is deformed, and the accelerometer is exposed to a high acceleration. The crash detector incorporates means responsive to this sensed high acceleration to deploy a safety device, such as an air-bag or a seat-belt pre-tensioner.

However, it has been found that an accelerometer mounted on the door of a motor vehicle or mounted on part of the door-frame may be subjected to a high acceleration when the door of the vehicle is slammed. The high acceleration may be sufficient to cause the safety device be deployed. This is clearly disadvantageous, since it is most undesirable for the safety device to be deployed as a consequence of a door slam.

It is not, however, appropriate simply to adjust the sensitivity of the accelerometer, since in a side impact situation it is very important that the safety device is deployed, and is deployed swiftly.

SUMMARY OF THE INVENTION

The present invention seeks to provide an improved crash detector.

According to this invention there is provided a crash detector for activating a safety device in a vehicle in response to a side impact comprising an accelerometer mounted on the door or part of the monocoque shell of the vehicle adjacent the door, the accelerometer being adapted to provide an acceleration signal indicative of the magnitude of the lateral acceleration to which the accelerometer is exposed, the signal increasing with increasing inward acceleration, and the direction of sensed acceleration relative to the centre-line of the vehicle, means being provided adapted to process the acceleration signal from the accelerometer to generate a control signal, the processing means being adapted to alter the value of the control signal, at least a major component of the alteration being an increase in the value of the control signal or an adjustment of the value of the control signal to make the control signal converge to at least an average of the acceleration signal from the accelerometer during periods of time in which the acceleration signal from the accelerometer indicates an inward acceleration in excess of predetermined level of acceleration, and at least a major component of the alteration being a reduction of the value of the control signal, by a substantially predetermined amount during successive periods of time when the acceleration signal from the accelerometer is indicative of inward acceleration which is less than the predetermined level, the control signal being passed to threshold means adapted to respond to enable actuation of the safety device only when the threshold has been exceeded.

Conveniently the predetermined level corresponds to zero inward acceleration.

Advantageously when the output signal from the accelerometer is indicative of inward accelerations, the control signal is adjusted by causing the control signal to converge towards a low pass filtered signal derived from the acceleration signal from the accelerometer.

Conveniently the low pass filtered signal is generated by, during each successive period of time, taking the then-current value for sensed acceleration and multiplying it by a constant k which is greater than zero but which is less than 1, and adding the resultant value to the final value for the control signal generated during the proceeding instant of time, multiplied by the difference between 1 and the constant k.

Advantageously during each period of time that the output signal from the accelerometer is indicative of less than the predetermined level acceleration, the control signal is adjusted, the value of the control signal being reduced.

Preferably the control signal is adjusted during each period of time, by subtracting a constant value from the value of the control signal during the preceding period of time.

Advantageously the processing means are provided with means to limit the maximum negative value that the control signal can have.

Conveniently the acceleration signal is substantially within a frequency band, having a predetermined upper limit which is between 300 Hz and 400 Hz.

Preferably actuating means are provided to activate the safety device when at least one actuating signal derived from the acceleration signal exceeds a predetermined threshold.

Conveniently the actuating signal is generated by subtracting a constant value from the acceleration signal and integrating the result.

Preferably the actuating signal is generated by passing the acceleration signal through low-pass filtering means.

Advantageously said actuating means are provided to actuate the safety device when two actuating signals derived from the acceleration signal each exceed a respective predetermined threshold.

Preferably at least one threshold varies with time.

Conveniently the or each threshold changes at the end of a first period of time and at the end of a second period of time.

Advantageously said processing means comprise a microprocessor.

The accelerometer may be mounted on the B-post of a vehicle, on a door sill of a vehicle, or in the door of a vehicle.

Preferably the accelerometer is associated with a threshold device, said acceleration signal being generated only when acceleration in excess of a predetermined limit has been sensed.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE PREFERRED EMBODIMENTS

Figure 1:
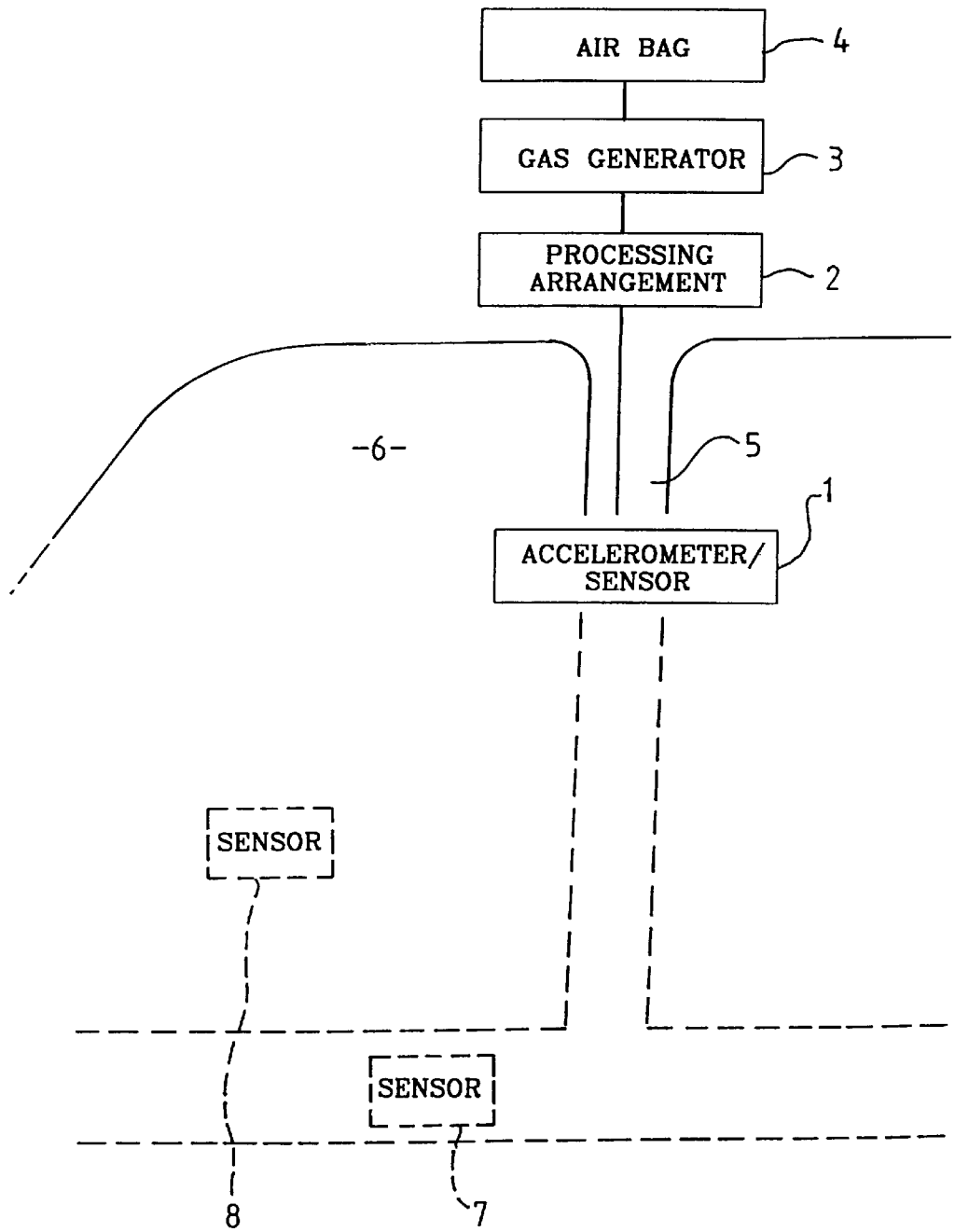
FIG. 1 is a diagrammatic representation of part of the body of a motor vehicle.

Referring initially to FIG. 1 of the accompanying drawings, a crash detector in accordance with the present invention comprises an accelerometer 1, the output of which is connected to a processing arrangement 2. The output of the processing arrangement 2 is connected to a gas generator 3 and is adapted to activate the gas generator when a crash is detected. The gas generator 3 is connected to an air-bag 4 which is initially in a folded state. The air-bag 4 is adapted to be inflated when gas is supplied to it, so that the air-bag may be deployed.

As can be seen in FIG. 1, the sensor 1 is mounted on the door pillar or B-post 5 of the motor vehicle. The processing arrangement 2, the gas generator 3 and the air-bag 4 are all mounted in the roof of the motor vehicle, with the air-bag 4 being located above the door opening 6 of the vehicle. When the air-bag is inflated, the air-bag is located between the driver of the vehicle and the side of the vehicle.

Whilst the sensor 1 is shown mounted on the B-post of the motor vehicle, the sensor 1 may be mounted in the door sill as shown in phantom, 7, or on the door itself, as shown in phantom, 8, or any other position where the sensor is responsive to an acceleration of the vehicle, or part of the vehicle, as a consequence of a side impact with another vehicle or with a fixed object.

Figure 2:
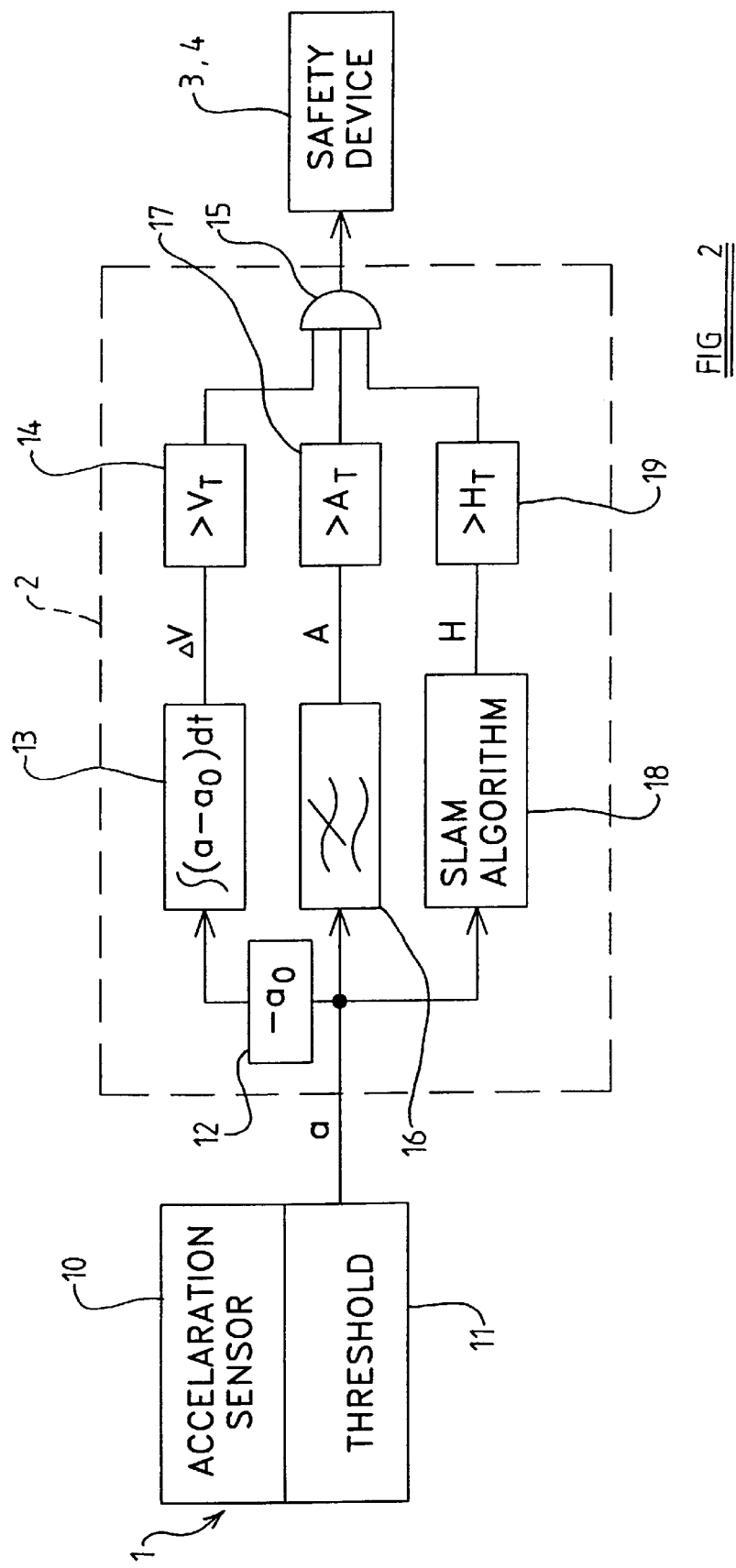
FIG. 2 is a block circuit diagram of a crash detector in accordance with the invention.

Referring to FIG. 2 of the accompanying drawings, the accelerometer 1 is provided which is shown as providing an output signal a representative of sensed acceleration. The acceleration signal a may be positive, indicating an acceleration sensed by the accelerometer directed towards the centre axial line of the vehicle, or may be negative, indicating a sensed acceleration directed outwardly away from the axial centre line of the vehicle.

At this stage, it should be mentioned that it is believed that the signal provided by the accelerometer will have a substantial positive content in the event of a side impact, since the accelerometer will be moved inwardly, towards the central axial line of the vehicle by the other vehicle or fixed object that is impinging on the side of vehicle in the side impact. However, in the case of a slamming door within the door-frame which is bounded by the B-post 5, whilst the B-post 5 may move inwardly towards the axial centre line of the vehicle with substantial rapidity for a very brief period of time, as the door is actually slammed, subsequently the B-post will return to its initial position, relative to the rest of the monocoque shell of the vehicle, thus providing an outwardly directed acceleration. Subsequently, the B-Post may oscillate. Thus, in the case of a slamming door, it is envisioned that the acceleration signal will have a positive content and a negative content.

The acceleration signal a is processed by the signal processor arrangement 2 which comprises a microprocessor. As will be described hereinafter in greater detail, the signal is processed, in the embodiment, in two different ways, to determine if the signal is representative of a side impact. However, the acceleration signal is also processed in a third way in order to determine if the acceleration signal is indicative of a side impact or, in the alternative, is indicative of a door slam. The arrangement is such that if the signal from the accelerometer is indicative of a door slam deployment of the safety device 3, 4, is inhibited.

The signal generated by the accelerometer is an analog signal which typically incorporates many frequency components. The frequency range of the accelerometer is normally 0 to 300–400 Hz. In a crash situation the acceleration signal may provide a substantial positive peak followed possibly by a relatively small negative trough, followed again by a further substantial positive peak. However, in a situation where a door is slammed, the acceleration signal may commence with a substantial positive peak, but will then, in a typical case, continue with a number of negative troughs interspersed by somewhat smaller positive peaks.

Referring to FIG. 2 of the accompanying drawing, the accelerometer 1 could be adapted to sense a maximum acceleration of 50 g or may be adapted to sense up to 100 g. The accelerometer incorporates an acceleration sensor 10, which is connected with a threshold device 11, so that the output a is only generated when the sensed acceleration exceeds a predetermined value. The threshold device could alternatively be arranged as part of the micro-processor 2.

The acceleration signal a is supplied as one input to a micro-processor 2 which comprises the processing arrangement. The micro-processor 2 operates at a clock frequency of 2,000 Hz. In other words, the microprocessor 2 operates with a sampling period of 0.5 ms.

Within the micro-processor three separate calculations or algorithms are formed on the input signal a.

A reference threshold $a_0$ is subtracted from the input signal a in a subtraction circuit 12. The output of the subtraction circuit is passed to an integrating circuit 13, where the difference between a and $a_0$ is integrated with respect to time. The integrated signal is representative of the change of velocity sensed by the acceleration sensor, represented as $\Delta V$.

The output signal of the integrator 13 comprises a first actuating signal for the safety device and is provided to a threshold circuit 14. When the integrated signal exceeds a predetermined threshold $V_T$, the threshold circuit 14 provides an output signal on an output which is connected as one input of a AND-gate 15. The output of the AND-gate 15 is connected to the safety device 3, 4 to activate the safety device.

It will be appreciated, therefore, that the first actuating signal constituted by the integrated acceleration signal must exceed a predetermined threshold before the safety device can be deployed.

The acceleration signal a that is input to the microprocessor 2 is also connected to a low-pass filter 16. The low-pass filter may be adapted to pass the frequency component of the acceleration signal a below a predetermined threshold, for example, below 150 Hz. The output of the low-pass filter, a filtered acceleration signal, A, which comprises a second actuating signal for the safety device is supplied as an input of a threshold circuit 17. When the filtered signal A from the low-pass filter 16 exceeds a predetermined threshold, $A_T$, the threshold circuit 17 provides an output signal on an output which is also connected to the AND-gate 15. The filtered signal A is representative of the acceleration sensed by the acceleration sensor, and thus it is to be appreciated that the signal provided by the threshold circuit 17 to the AND-gate 15 is only supplied when the second actuating signal derived from the acceleration signal exceeds a predetermined threshold.

The acceleration signal a that is input to the microprocessor 2 is also provided to a slam algorithm processor 18.

The slam algorithm processor processes the input signal and is adapted to generate a control signal H. As will be explained, the control signal H rises relatively swiftly when the acceleration sensor senses a side impact, but does not rise, or even falls, when the acceleration sensor merely senses a door being slammed. The output of the slam algorithm processor 18 is connected to a threshold circuit 19 which is adapted to generate an output when the control signal H generated by the slam algorithm processor 18 exceeds a predetermined threshold $H_T$. The output of the threshold circuit 19 is connected as the third and final input to the AND-gate 15.

The AND-gate 15 is adapted to generate an output to deploy the safety device 3, 4, when it is provided with input signals on all three of the above-described inputs. Consequently, it is to be appreciated that the AND-gate 15 will only generate the output signal necessary to deploy the safety device when the sensed change in velocity exceeds a predetermined threshold, when the sensed acceleration exceeds a predetermined threshold and when the slam algorithm processor generates a control signal indicative of side impact in contrast to a control signal indicative of a door slam.

The slam algorithm processor 18 is adapted to alter the value of the control signal H in response to the acceleration signal a. When the acceleration signal a exceeds a predetermined level on one sense—for example when the acceleration signal a exceeds zero in a positive sense—the slam algorithm processor generates a control signal H which over a period of time converges towards the magnitude of the input signal, but in which any irregularities in the input signal are "smoothed". This can be achieved in a number of different ways, but in the preferred embodiment of the invention, at each cycle of operation of the micro-processor, or during each 0.5 ms sampling period, the slam algorithm processor will determine the new value for the control signal H by ascertaining the instantaneous value of the signal a provided by the accelerometer 1. This is multiplied by a filtering co-efficient K. This value is added to the previously determined value of the control signal H multiplied by (1−K). The filtering co-efficient K is between zero and one.

In other words, for any instant n in a successive series of instants, the sensed acceleration will be $a_n$ and the value of the control signal H will be expressed by the following formula:

$$H_n=([k^*(a_n)]+[(1-k)^*H_{n-1}]).$$

This formula effectively represents a conventional digital low pass filter.

The formula may be modified by the requirement that if $H_n$ is less than −50 g, then it will be deemed to be equal to −50 g. The formula maybe modified so that the formula expresses a major component of the change in value of H during successive instants of time.

If the acceleration signal a generated by the accelerometer 1 should exceed the predetermined level in the opposite sense—for example, When the acceleration signal a exceeds zero in a negative sense—then the slam algorithm processor 18 will follow a different procedure. Instead of maintaining a positive control signal H in the manner described above, during each cycle of operation of the micro-processor, that is to say during each 0.5 ms sampling period, the slam algorithm processor 18 will subtract a constant value, α from the value of the control signal H during the preceding sampling period. Expressed mathematically:

$$H_n = H_{n-1} - \alpha$$

Again, if $H_n$ is less than −50 g, it will be deemed to be −50 g. Again, the formula may be modified so that the formula expresses a major component in the change of value of H during successive instants of time.

It is thus to be appreciated that in a side impact situation, where the acceleration signal a is generally positive-going, with only very small negative-going troughs, the integrator 13 will generate an output signal which exceeds the threshold $V_T$ and the filter 16 will generate an output signal which exceeds the threshold $A_T$. The slam algorithm processor 18 will also generate a control signal which exceeds the threshold $H_T$ and consequently the safety device 3, 4 will be deployed.

In contrast, however, in the event that a door is slammed, whilst the acceleration signal a may be such that the output of the integrator 13 exceeds threshold $V_T$ and such that the output of the filter 16 exceeds the threshold $A_T$, the control signal H generated by the slam algorithm processor will not exceed the threshold $H_T$. The reason is that during the negative-going portions of the acceleration signal a, the slam algorithm processor will subtract, during each cycle of operation, the value α from the control signal, thus substantially reducing the control signal of the slam algorithm processor. Consequently, even during any subsequent positive-going portions of the acceleration signal a, when the slam algorithm processor will act to increase the value of the control signal generated by the slam algorithm processor, the threshold $H_T$ will not be surpassed.

Whilst, in the described embodiment of the invention, the slam algorithm processor performs one procedure if the signal generated by the accelerometer 1 is positive-going and another procedure, if the signal generated by the accelerometer 1 is negative-going, it is to be appreciated that the slam algorithm processor may be adjusted so that it performs one procedure when the output of the accelerometer exceeds a predetermined threshold (which need not be zero) in one sense and an alternative procedure if the output of the accelerometer exceeds the said threshold in the opposite sense.

The integrator 13 may be adapted to integrate only for a predetermined period of time, that period of time being equivalent to the maximum expected duration of a side impact, which may be 127 ms, the arrangement being such that the entire processing procedure described above is "re-set" if the safety device has not been deployed at the end of that integration time.

It may be appropriate to divide the maximum permitted period of time described above into three separate "windows" comprising instant 0 to instant $T_1$, instant $T_1$ to instant $T_2$ and instant $T_2$ to the end of the permitted period. During each of these three windows, it may be appropriate to utilise different threshold values $V_T, A_T$ and $H_T$ for use by the three threshold circuits 14, 17 and 19.

Figure 3:
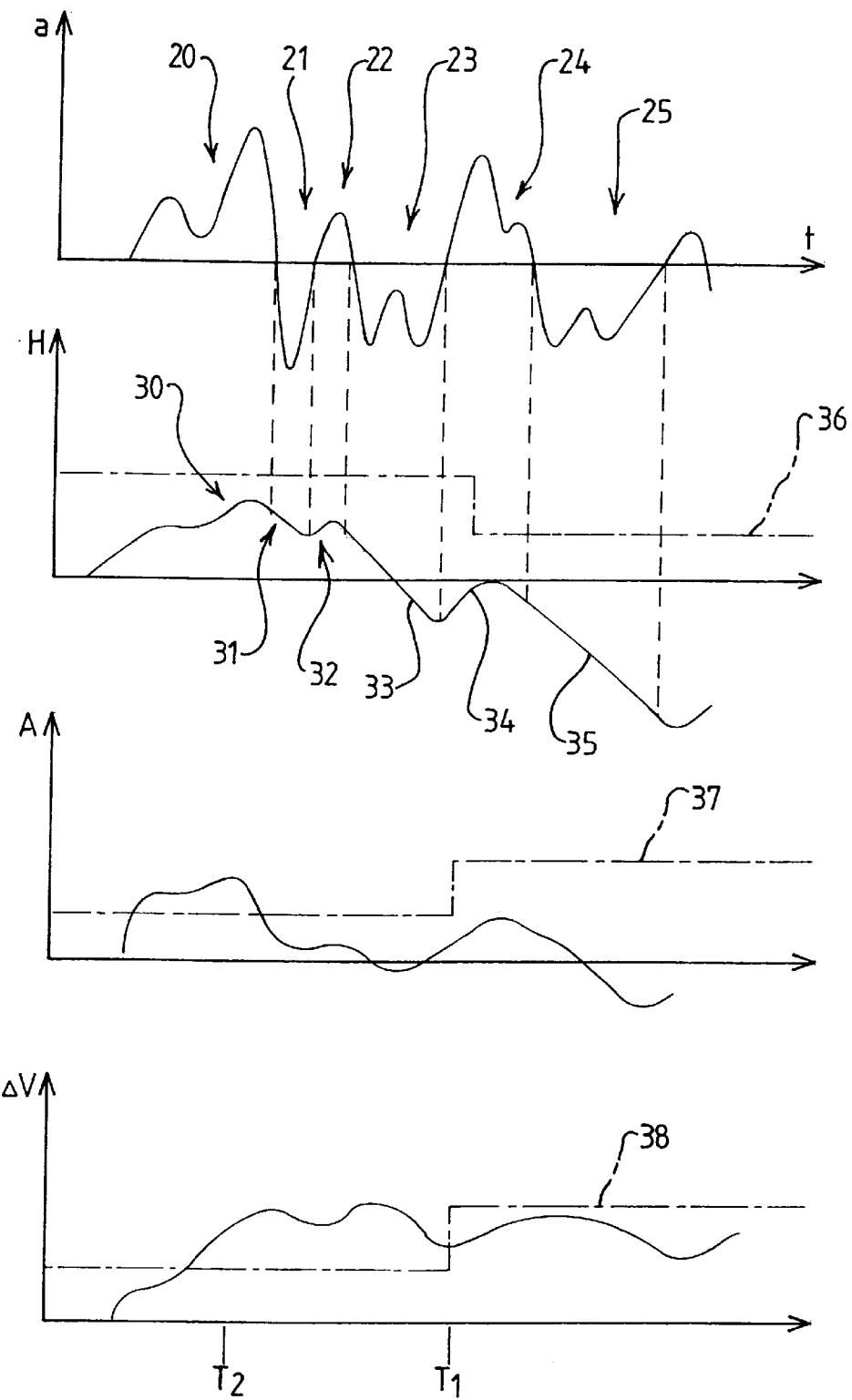
FIG. 3 is a graphical figure illustrating waveforms present, over a predetermined period of time, at various points in the crash detector illustrated in FIG. 2.

Referring now to FIG. 3, the first graphical figure is a representation of a typical waveform comprising the acceleration signal a with respect to time (t) in the case of a door slam. It can be seen that the waveform starts with a double positive-going peak 20 followed by a substantial negative trough 21, this being followed by a further positive peak 22, which in turn is followed by a double negative-going trough 23. A further double positive peak 24 is followed by a further negative-going trough 25.

The second graph illustrates the control signal H generated by the slam algorithm processor 18. It can be seen that in the region 30 the output rises as a generally "smoothed" version of the double peak 20. However, in the region of the negative-going trough 21, the control signal H, in region 31, declines towards a negative value with a predetermined slope This is because, during each instant of time, the constant value α is subtracted from the preceding value for H. Subsequently, in region 32, which corresponds to the positive-going peak 22 of the acceleration signal a from the accelerometer, the control signal H rises slightly. Next, however, in the region 33, which corresponds to the negative-going region 23 of the signal a from the accelerometer, the control signal H again falls, with the same predetermined slope.

A further rising part 34 of the control signal H, corresponds with the positive-going peak 24 of the acceleration signal a, and this is followed by a final negative-going portion 35 which corresponds with the portion 25 of the signal a from the accelerometer.

In the graphical figure illustrating the control signal H, a dotted line 36 is provided which illustrates the threshold $H_T$. It can be seen that at time T1 the threshold drops from a first relatively high level to a lower level The threshold will change again at a subsequent time $T_2$.

The next graphical figure illustrates A, that is to say the output of the low pass filter 16. This signal is effectively a filtered version of the signal a with the high-frequency "peaks" being smoothed out.

On the figure illustrating the output A, another dotted line 37 is provided illustrating the threshold value $A_T$. It can be seen that the threshold value changes at time $T_1$. This threshold will also change again at the subsequent time $T_2$.

The fourth graphical figure present in FIG. 3 shows ΔV, the output of the integrator 13. On this figure, again a dotted line 38 is provided showing the threshold value $V_T$ and again this threshold value changes at time $T_1$. This threshold will also change again at the subsequent time $T_2$.

It is to be appreciated that at time $T_5$ shown in the lower-most graphical figure, ΔV is greater than the then-existing threshold value $V_T$ and also A is greater than the threshold value $A_T$. However, at that point in time, the output H of the slam algorithm processor is not greater than the then current threshold 36 and consequently, the safety device is not deployed.

In an accident situation, however, the safety device would be deployed since a different waveform will be generated by the accelerometer.

What is claimed is:

1. A crash detector for activating a safety device in a vehicle in response to a side impact comprising:

an accelerometer mounted on the door or on part of the monocoque shell of the vehicle adjacent the door, the accelerometer providing an acceleration signal indicative of the magnitude of the lateral acceleration to which the accelerometer is exposed and the direction of sensed acceleration relative to the centre-line of the vehicle where the acceleration signal increases with increasing inward acceleration; and means for processing the acceleration signal from the accelerometer to generate a control signal, said processing means altering the value of the control signal, where at least a major component of the alteration is an increase in the value of the control signal or an adjustment of the value of the control signal to make the control signal converge to at least an average of the acceleration signal from the accelerometer during periods of time in which the acceleration signal from the accelerometer indicates an inward acceleration in excess of a predetermined level of acceleration, and where at least a major component of the alteration is a reduction of the value of the control signal, by a substantially predetermined amount during successive periods of time when the acceleration signal from the accelerometer is indicative of inward acceleration which is less than said predetermined level, the control signal being passed to threshold means enabling actuation of the safety device only when the threshold has been exceeded.

2. The crash detector according to claim 1 wherein the predetermined level corresponds to zero inward acceleration.

3. The crash detector according to claim 2 wherein when the output signal from the accelerometer is indicative of inward acceleration, the control signal is adjusted by causing the control signal to converge towards a low pass filtered signal derived from the acceleration signal from the accelerometer.

4. The crash sensor according to claim 3 wherein the low pass filtered signal is generated by, during each successive period of time, taking the then-current value for sensed acceleration and multiplying it by a constant k which is greater than zero but which is less than 1, and adding the resultant value to the final value for the control signal generated during the preceding instant of time, multiplied by the difference between 1 and the constant k.

5. The crash detector according to claim 1 wherein during each period of time that the output signal from the accelerometer is indicative of less than the predetermined level acceleration, the control signal is adjusted, the value of the control signal being reduced.

6. The crash detector according to claim 5 wherein the control signal is adjusted, during each period of time, by subtracting a constant value from the value of the control signal during the preceding period of time.

7. The crash detector according to claim 1 wherein the processing means are provided with means to limit the maximum negative value of the control signal.

8. The crash detector according to claim 1 wherein the acceleration signal is substantially within a frequency band, having a predetermined upper limit which is between 300 Hz and 400 Hz.

9. The crash detector according to claim 1 wherein activating means are provided to activate the safety device when at least one actuating signal derived from the acceleration signal exceeds a predetermined threshold.

10. The crash detector according to claim 9 wherein the actuating signal is generated by subtracting a constant value from the acceleration signal and integrating the result.

11. The crash detector according to claim 9 wherein the actuating signal is generated by passing the acceleration signal through low-pass filtering means.

12. The crash detector according to claim 8 wherein said actuating means are provided to actuate the safety device when two actuating signals derived from the acceleration signal each exceed a respective predetermined threshold.

13. The crash detector according to claim 1 wherein at least one threshold varies with time.

14. The crash detector according to claim 13 wherein the at least one threshold changes at the end of a first period of time and at the end of a second period of time.

15. The crash detector according to claim 1 wherein said processing means comprise a micro-processor.

16. The crash detector according to claim 1 wherein said accelerometer is mounted on the B-post of said vehicle.

17. The crash detector according to claim 1 wherein said accelerometer is mounted on the door sill of said vehicle.

18. The crash detector according to claim 1 wherein said accelerometer is mounted on the door of said vehicle.

19. The crash detector according to claim 1 wherein the accelerometer is associated with a threshold device, said acceleration signal being generated only when acceleration in excess of a predetermined limit has been sensed.

20. A crash detector for activating a safety device in a vehicle in response to a side impact comprising:

an accelerometer mounted on the door or on part of the monocoque shell of the vehicle adjacent the door, the accelerometer providing an acceleration signal indicative of the magnitude of the lateral acceleration to which the accelerometer is exposed, and the direction of sensed acceleration relative to the centre-line of the vehicle where the acceleration signal increases with increasing inward acceleration; and means for processing the acceleration signal from the accelerometer to generate a control signal, said processing means altering the value of the control signal, where at least a major component of the alteration is an increase in the value of the control signal or an adjustment of the value of the control signal to make the control signal converge to at least an average of the acceleration signal from the accelerometer during periods of time in which the acceleration signal from the accelerometer indicates an inward acceleration in excess of a predetermined level of acceleration, and where at least a major component of the alteration is a reduction of the value of the control signal, by a substantially predetermined amount during successive periods of time when the acceleration signal from the accelerometer is indicative of inward acceleration which is less than said predetermined level, the control signal being passed to threshold means enabling actuation of the safety device only when the threshold has been exceeded;

wherein during each period of time that the output signal from the accelerometer is indicative of less than the predetermined level acceleration, the control signal is adjusted, to a reduced value.

21. A crash detector for activating a safety device in a vehicle in response to a side impact comprising:

an accelerometer mounted on the door or on part of the monocoque shell of the vehicle adjacent the door, the accelerometer providing an acceleration signal indicative of the magnitude of the lateral acceleration to which the accelerometer is exposed, and the direction of sensed acceleration relative to the centre-line of the vehicle where the acceleration signal increases with increasing inward acceleration; and means for processing the acceleration signal from the accelerometer to generate a control signal, said processing means altering the value of the control signal, where at least a major component of the alteration is an increase in the value of the control signal or an adjustment of the value of the control signal to make the control signal converge to at least an average of the acceleration signal from the accelerometer during periods of time in which the acceleration signal from the accelerometer indicates an inward acceleration in excess of a predetermined level of acceleration, and where at least a major component of the alteration is a reduction of the value of the control signal, by a substantially predetermined amount during successive periods of time when the acceleration signal from the accelerometer is indicative of inward acceleration which is less than said predetermined level, the control signal being passed to threshold means enabling actuation of the safety device only when the threshold has been exceeded;

wherein during each period of time that the output signal from the accelerometer is indicative of less than the predetermined level acceleration, the control signal is adjusted, to a reduced value by subtracting a constant value from the value of the control signal during the preceding period of time.

* * * * *